US010513975B2

(12) United States Patent
Bagayatkar

(10) Patent No.: US 10,513,975 B2
(45) Date of Patent: Dec. 24, 2019

(54) LUBRICATION SYSTEM FOR WASTE HEAT RECOVERY GEAR BOX

(71) Applicant: Cummins Inc., Columbus, IN (US)

(72) Inventor: Nimish Bagayatkar, Carmel, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/923,707

(22) Filed: Mar. 16, 2018

(65) Prior Publication Data
US 2018/0202352 A1 Jul. 19, 2018

Related U.S. Application Data

(63) Continuation of application No. 15/546,082, filed as application No. PCT/US2016/055087 on Oct. 2, 2016, now Pat. No. 9,932,889.

(60) Provisional application No. 62/236,127, filed on Oct. 1, 2015, provisional application No. 62/294,058, filed on Feb. 11, 2016.

(51) Int. Cl.
*F02B 39/08* (2006.01)
*F01K 23/06* (2006.01)
*F16H 57/04* (2010.01)

(52) U.S. Cl.
CPC .......... *F02B 39/085* (2013.01); *F01K 23/065* (2013.01); *F16H 57/0436* (2013.01); *F16H 57/0441* (2013.01); *F16H 57/0445* (2013.01)

(58) Field of Classification Search
CPC .............. F02B 39/085; F16H 57/0445; F16H 57/0436; F16H 57/0441; F16H 57/0434; F01K 23/065; Y02T 10/16; F01M 5/002; F16N 13/10

USPC .......................................... 60/614, 616, 618
See application file for complete search history.

(56) References Cited

U.S. PATENT DOCUMENTS

| 2,191,289 A | 2/1940 | Price |
| 3,443,376 A * | 5/1969 | Light ................... G01L 3/1464 60/602 |
| 4,145,888 A | 3/1979 | Roberts |
| 5,031,725 A | 7/1991 | Millar |

(Continued)

FOREIGN PATENT DOCUMENTS

| JP | 2010190186 | 9/2010 |
| JP | 5529070 | 7/2013 |
| WO | WO 2014/117156 | 7/2014 |

OTHER PUBLICATIONS

International Search Report and Written Opinion dated Feb. 3, 2017, for International Patent Application No. PCT/US2016/55087; 12 pages.

(Continued)

*Primary Examiner* — Hoang M Nguyen
(74) *Attorney, Agent, or Firm* — Faegre Baker Daniels LLP

(57) ABSTRACT

A lubrication system and method for an engine are provided. In some embodiments, the lubrication method comprises driving a lube pump with a gearbox in a power drive housing, the gearbox including an expander shaft of an expander of a waste heat recovery system; suctioning lubrication fluid, with the lube pump, from a lube sump in the power drive housing; lubricating, with the lubrication fluid, an expander shall bearing supporting the expander; and after lubricating the expander shall bearing, transferring the lubrication fluid to the lube sump waste heat recovery power drive and lubrication system therefor.

18 Claims, 15 Drawing Sheets

(56) References Cited

U.S. PATENT DOCUMENTS

| | | | |
|---|---|---|---|
| 5,045,711 A | 9/1991 | Swearingen | |
| 8,556,577 B2 | 10/2013 | Bell | |
| 9,932,889 B2* | 4/2018 | Bagayatkar | F01M 5/002 |
| 2002/0121089 A1* | 9/2002 | Filippone | F01K 23/065 |
| | | | 60/608 |
| 2006/0185631 A1 | 8/2006 | Fitzgerald | |
| 2006/0196464 A1 | 9/2006 | Conners | |
| 2007/0240420 A1 | 10/2007 | Bronicki | |
| 2008/0110171 A1 | 5/2008 | Schmeltz | |
| 2010/0034684 A1 | 2/2010 | Ast | |
| 2010/0043432 A1 | 2/2010 | Filippone | |
| 2010/0101228 A1* | 4/2010 | Bartosch | F01K 23/065 |
| | | | 60/712 |
| 2013/0180242 A1 | 7/2013 | Lancaster | |
| 2014/0165562 A1 | 6/2014 | Nagai | |
| 2014/0260250 A1 | 9/2014 | Oxner | |
| 2014/0345274 A1 | 11/2014 | Ernst | |
| 2014/0352301 A1 | 12/2014 | Mueller | |

OTHER PUBLICATIONS

International Preliminary Report on Patentability dated Apr. 3, 2018, for International Patent Application No. PCT/US2016/55087; 9 pages.

* cited by examiner

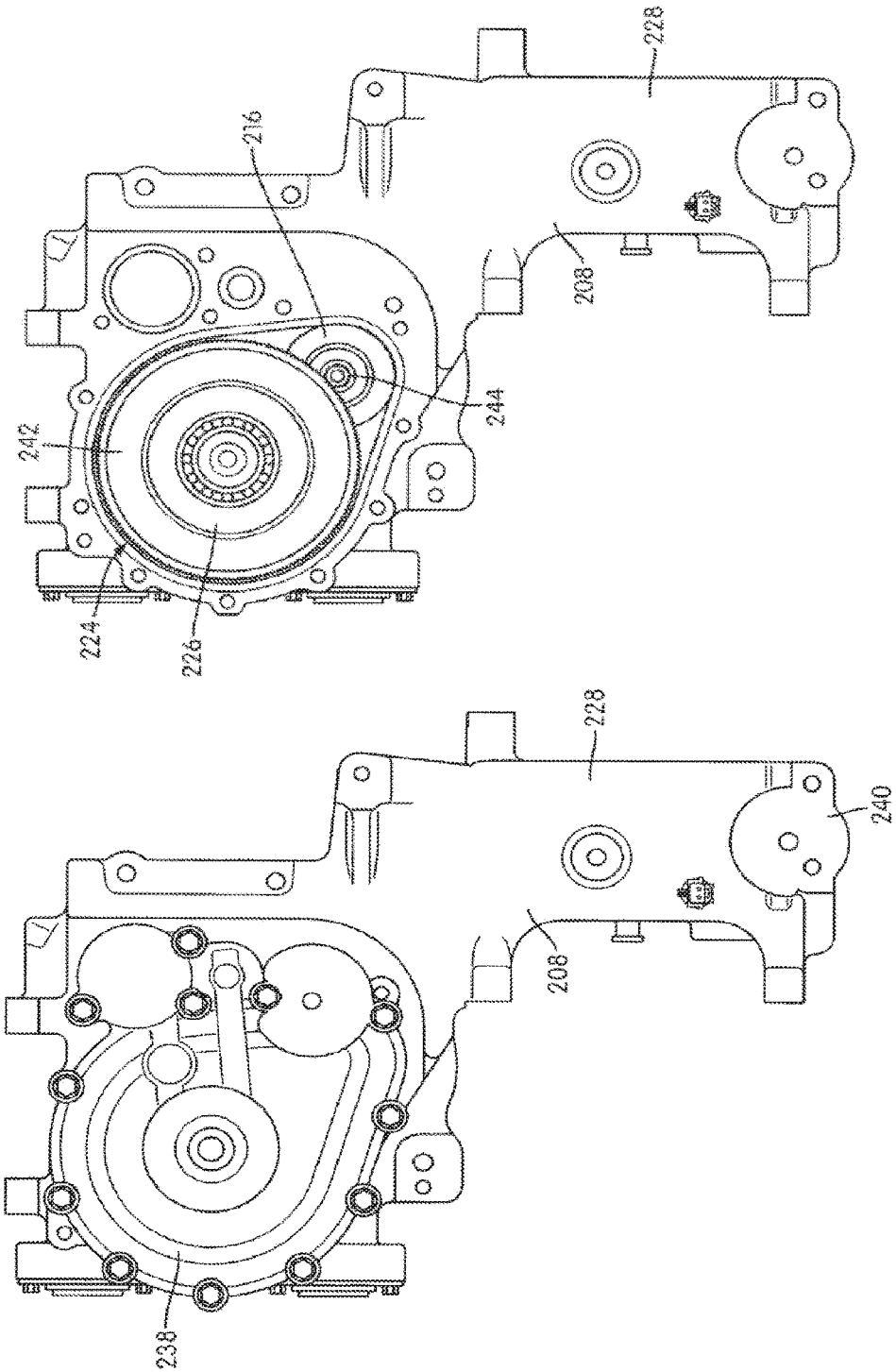

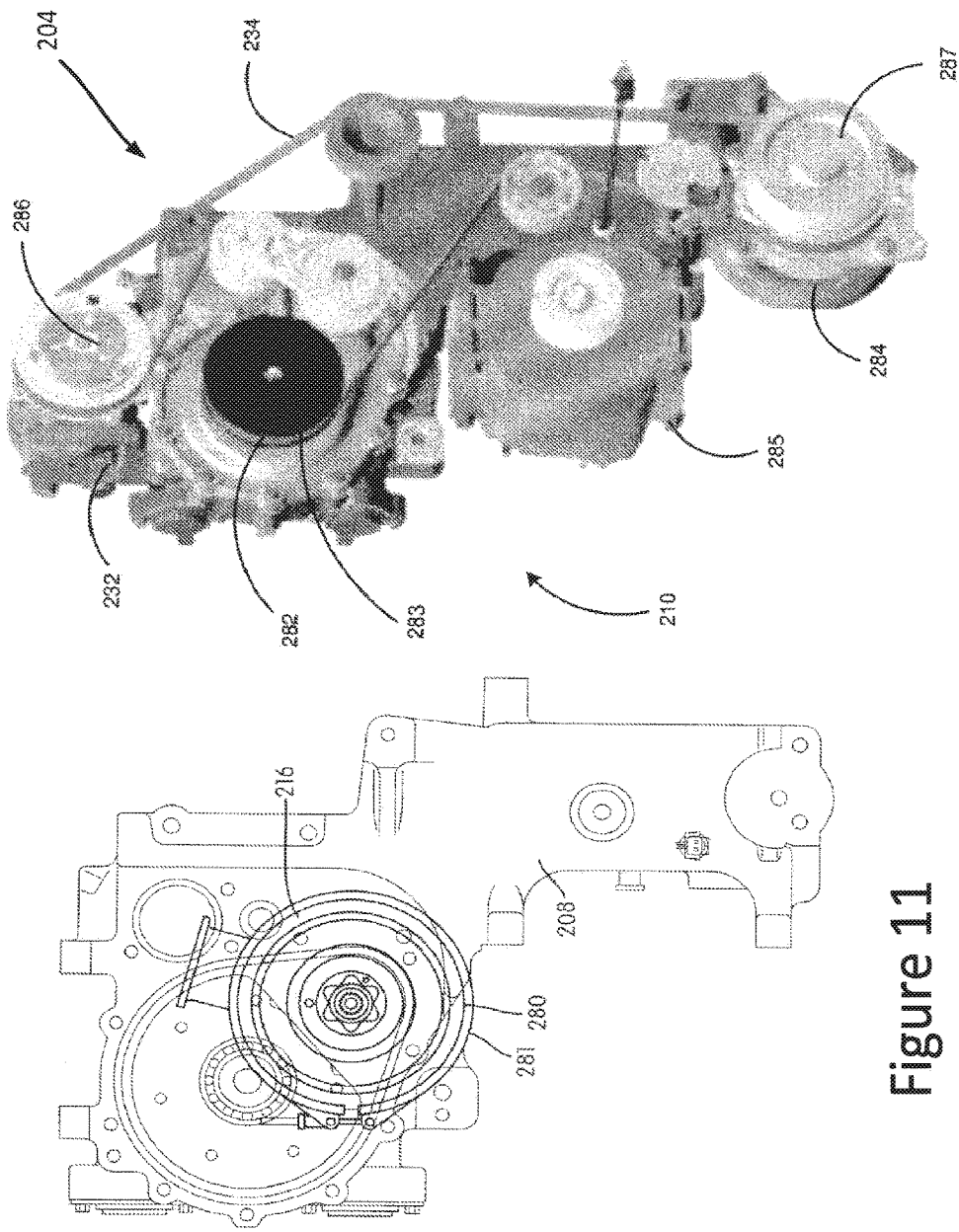

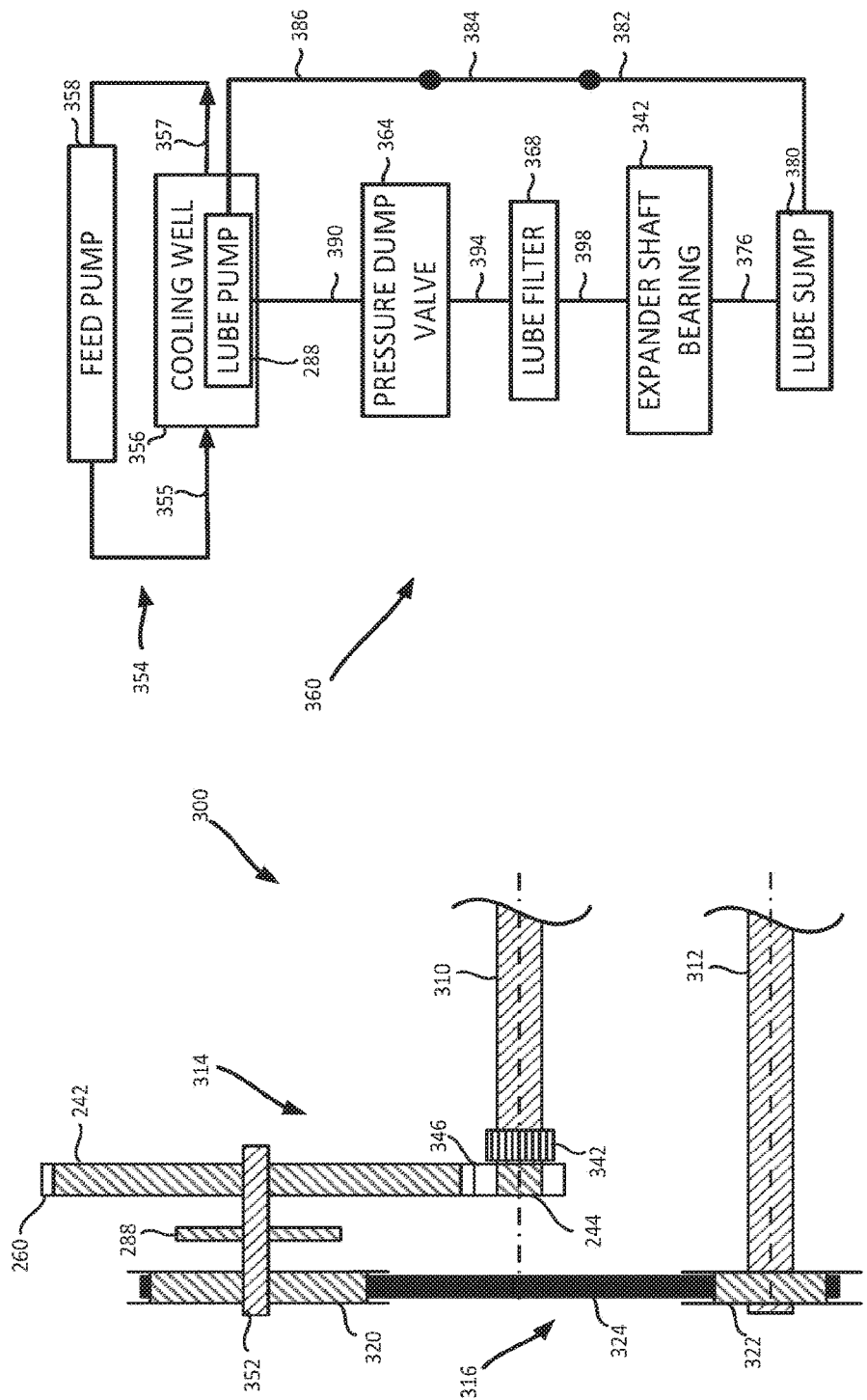

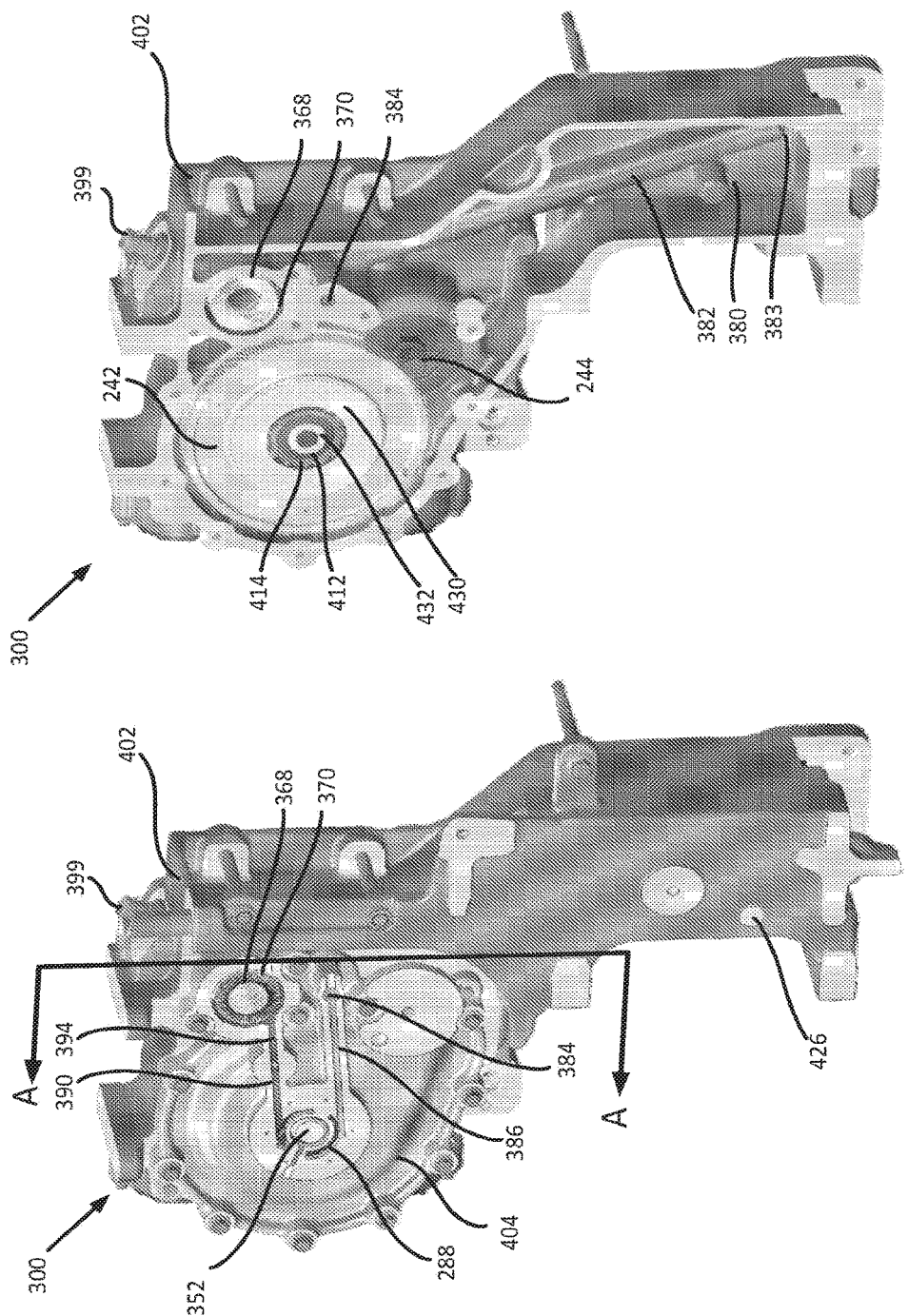

LUBRICATION SYSTEM FOR WASTE HEAT RECOVERY GEAR BOX

CROSS-REFERENCE TO RELATED APPLICATIONS

This application is a continuation of U.S. Pat. No. 9,932,889, issued Apr. 3, 2018, which is a § 371 application of International Application No. PCT/US2016/055087, filed Oct. 2, 2016, which claims the benefit of commonly-owned U.S. Patent Application No. 62/236,127, filed Oct. 1, 2015 and U.S. Patent Application No. 62/294,058, filed Feb. 11, 2016; the disclosures of said applications are incorporated herein in their entirety by reference thereto.

FIELD OF THE DISCLOSURE

The disclosure generally relates to waste heat recovery systems for internal combustion engines and to waste heat recovery system lubrication systems and methods.

BACKGROUND OF THE DISCLOSURE

Internal combustion engines generate heat during the combustion process. About half of the energy generated by the combustion process may be delivered to the flywheel of the engine. The discharged heat energy that is not used to perform useful work is typically known as "waste heat." Waste heat recovery ("WHR") systems aim to capture some of the waste heat energy by recovering heat energy and using it to drive an expander to convert the recovered heat energy to power, thereby potentially increasing the combustion efficiency. Example expanders include turbines and pistons.

Some WHR systems utilize a Rankine cycle ("RC"). The RC is a thermodynamic process in which heat is transferred to a working fluid in an RC circuit. The working fluid is pumped to a boiler where it is vaporized. The vapor is passed through an expander and then through a condenser, where the vapor is condensed back to a liquid. The expanding working fluid vapor causes the expander to rotate, thereby converting the waste heat energy to mechanical energy. The mechanical energy may be transmitted to engine system components, such as a pump, a compressor, a generator, etc.

WHR systems are complex, require fluid circuits, and include many components that add weight to any vehicle powered by the internal combustion engine. Accordingly, it is desirable to provide an improved WHR system that is more compact and less complex than present WHR systems.

The background of the disclosure is described herein to explain the context of the present invention. This is not to be taken as an admission or a suggestion that any of the material referred to was published, known or part of the common general knowledge in the art to which the present invention pertains, in the United States or in any other country, as at the priority date of any of the claims.

SUMMARY OF DISCLOSED EMBODIMENTS

A waste heat recovery power drive system for an internal combustion engine, a waste heat recovery system, and lubrication systems and methods for waste heat recovery power drive systems are provided. The waste heat recovery power drive system includes a waste heat recovery system and a gearbox structured to transfer power from the wast heat recover system to the crankshaft of the engine. In some embodiments, the gearbox mechanically couples a lube pump and a feed pump of the waste heat recovery system on a common shaft driven by an expander of the waste heat recovery system, providing a compact integrated cooling, lubrication, and power transfer system. In some embodiments, a unitary assembly includes the gearbox and the expander and is removable from the engine as a unit.

In some embodiments, the lubrication method comprises driving a lube pump with a gearbox in a power drive housing, the gearbox including an expander shaft of an expander of a waste heat recovery system; suctioning lubrication fluid, with the lube pump, from a lube sump in the power drive housing; lubricating, with the lubrication fluid, an expander shaft bearing supporting the expander; and after lubricating the expander shaft bearing, transferring the lubrication fluid to the lube sump.

In some embodiments, a combustion engine comprises a crankshaft; a waste heat recovery system including an expander having an expander shaft; a lube pump; an output shaft coupled to the lube pump; a first speed-reducing means for transferring power from the expander shaft to the output shaft to drive the lube pump; and a second speed-reducing means for transferring power from the output shaft to the crankshaft.

In some embodiments, a lubrication system comprises a power drive housing including an enclosure cover mounted on a power drive housing body; a lube sump enclosed by the power drive housing; a first gear train adapted to be driven by an expanding device of a waste heat recovery system having an expander shaft; an output shaft supporting the lube pump and driven by the first gear train; and a lube sump, wherein the lube pump is configured to suction a lubrication fluid from the lube sump to lubricate the first gear train.

In a further embodiment, a waste heat recovery power drive system is provided, comprising a waste heat recovery system comprising a boiler operatively coupled to an engine so as to receive heat energy from the engine and transfer the heat energy to a working fluid; and an expander fluidly coupled to the boiler so as to receive the working fluid from the boiler, the expander structured to convert heat energy from the working fluid to mechanical energy; a gearbox operatively coupled to the expander; a front engine accessory drive comprising a belt drive operatively coupling the gearbox to a crankshaft of the engine so as to transfer the mechanical energy from the gearbox to the crankshaft of the engine; and a unitary assembly comprising the front engine accessory drive, the gearbox, and the expander, the unitary assembly being removable from the engine as a unit.

There has thus been outlined, rather broadly, various features of the invention so that the present contribution to the art may be better appreciated. The attendant advantages of this invention, the manner of attaining them, and other features of the present invention, will become more apparent and will be better understood by reference to the following detailed description of disclosed embodiments taken in conjunction with the accompanying drawings and claims.

BRIEF DESCRIPTION OF THE DRAWINGS

FIG. 3 is a front elevational view illustration of a gearbox of the WHR power drive system of FIG. 2.

FIG. 4 is a front elevational view illustration of the gearbox of FIG. 3, with an enclosure cover omitted.

FIG. 11 is a front elevational view illustration of the gearbox of FIG. 3 showing an expander of the WHR power drive system of FIG. 2.

FIG. 12 is a perspective view illustration of the WHR power drive system of FIG. 2.

FIG. 14 is a schematic diagram of an embodiment of a gearbox of a WHR power drive system.

FIG. 15 is a flow diagram of an embodiment of a lubrication circuit of the WHR power drive system of FIG. 14.

FIG. 18 is a perspective view illustration of the gearbox of FIG. 16 sectioned along plane A-A.

FIG. 19 is a perspective view illustration of the gearbox of FIG. 16 with an enclosure cover removed.

Figure 1:
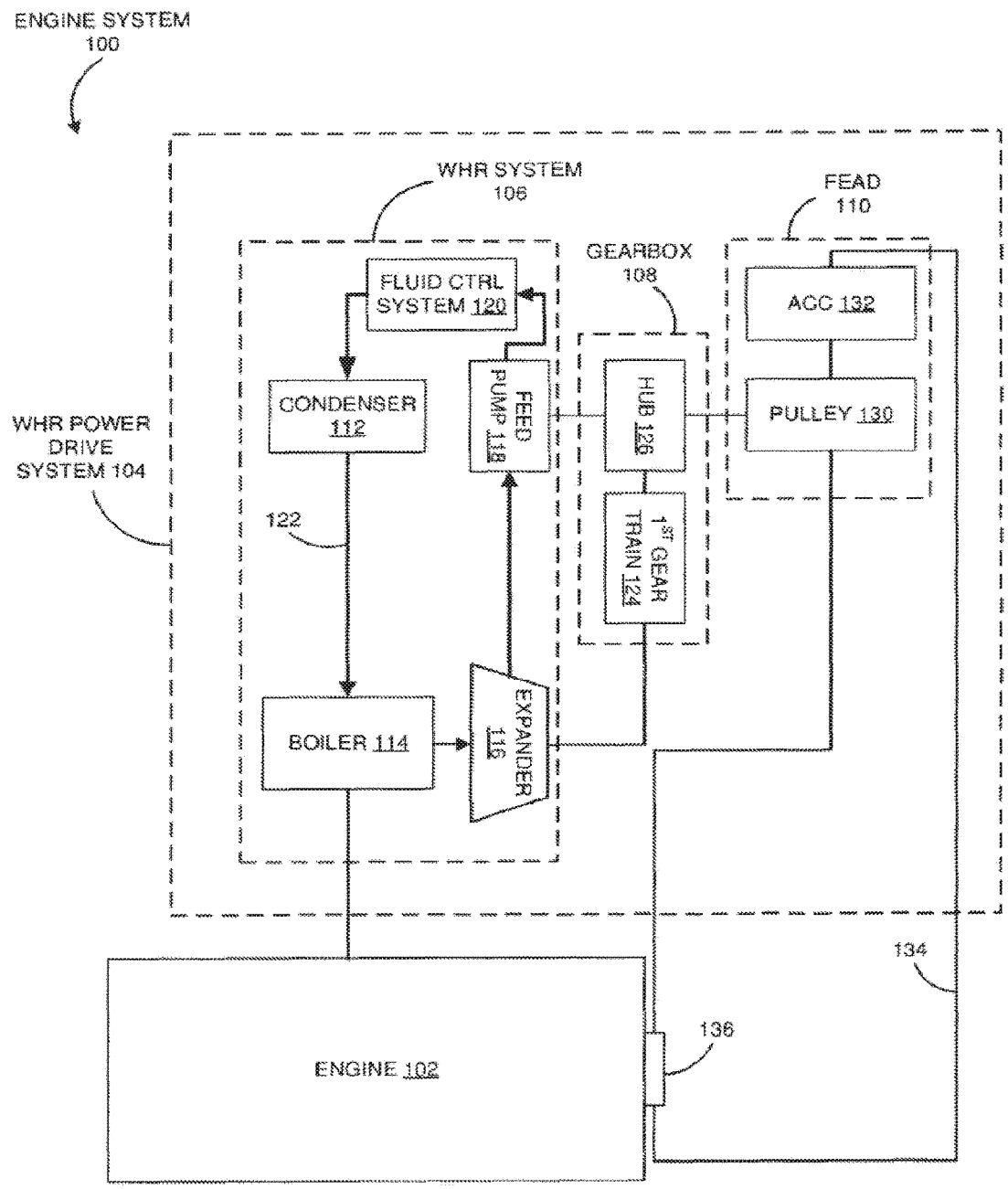
FIG. 1 is a block diagram of an embodiment of an engine system, including an engine and a WHR power drive system.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

DETAILED DESCRIPTION OF DISCLOSED EMBODIMENTS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Except where a contrary intent is expressly stated, the following terms have the following meanings:

"About" as used herein when referring to a measurable value such as an amount, a temporal duration, and the like, is meant to encompass the exact numerical value as though it had been recited without the term "about".

The transitional terms "comprises," "comprising," "containing," and "having" and the like mean "includes," "including," and the like, are inclusive or open ended terms and do not exclude additional, unspecified elements or method steps. By contrast, the transitional term "consisting" is a closed term which does not permit addition of unspecified terms.

"Example" as used herein is intended to indicate possible examples, representations, and/or illustrations of elements or embodiments and such term is not intended to connote that such elements or embodiments are necessarily extraordinary or superlative examples.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Except where a contrary intent is expressly stated, terms are used in their singular form for clarity and are intended to include their plural form.

Actions recited in the claims may be performed in any order, and in particular an order different than the order presented, unless an order is expressly or inherently claimed. The depictions in the accompanying figures do not necessarily require a particular order or sequential order.

Occurrences of the phrase "in one embodiment," or "in one aspect," herein do not necessarily all refer to the same embodiment or aspect.

Referring generally to the figures, various embodiments relate to WHR power drive systems. According to various embodiments, WHR power drive systems may include several components or subsystems structured to optimize the amount of power recovered from waste heat of an engine. Multiple ones of the components or subsystems may be integrated into a single unitary assembly. The recovered power may be utilized in several ways, such as to supplement power to the crankshaft of the engine, to power accessories, to generate electrical energy, etc.

In an embodiment, a WHR power drive system includes a WHR system, a gearbox, and a front engine accessory drive ("FEAD") In one example of this embodiment, an expander, a feed pump, and control valves of the WHR system, along with a gear train of the gearbox and the FEAD, are integrated into a single unitary assembly.

In some embodiments, a gearbox is structured to transfer energy from the WHR system to the crankshaft of the engine. In one variation, the gearbox comprises a combination of hard gearing and a flexible damping belt drive so as to maximize operational efficiency of the WHR power drive system and reduce vibration of the WHR power drive system.

In some embodiments, the gearbox defines a cooling passage that is fluidly coupled to a working fluid circuit and structured to receive a working fluid from the working fluid circuit so as to cool the gearbox and oil disposed therein.

In some embodiments, an expander used for converting energy in an RC may be positioned so as to facilitate oil drainage from the WHR power drive system.

In some embodiments, a FEAD includes auxiliary engine systems and components that are driven by energy converted by the WHR system.

The WHR power drive system may be structured such that the entire system may easily be removed, and thus, by replacing the entire WHR power drive system, on-site repair and the associated downtime may be avoided. In addition, a size and a weight of the WHR power drive system may be minimized by the structure described in the present disclosure, thereby reducing material costs, improving efficiency (e.g., fuel economy), and enabling the system to be implemented in smaller spaces.

FIG. 1 is a block diagram of an embodiment of an engine system, denoted by numeral 100, including an engine 102 and a WHR power drive system 104. Engine 102 may be an internal combustion engine, such as a compression ignition or spark ignition engine, and may be fueled by various types of fuels, such as diesel, gasoline, compressed natural gas, ethanol, etc. The WHR power drive system 104 includes a WHR system 106, a gearbox 108, and a FEAD 110. In general, WHR system 106 is structured to convert waste heat produced by engine 102 into useful energy, such as mechanical energy (e.g., which may be transferred to the crankshaft of engine 102 or used to power components of FEAD 110) and/or electrical energy (e.g., which may be stored in a battery for later use). WHR system 106 includes a working fluid circuit 122 comprising a condenser 112, a boiler 114, an expander 116, a feed pump 118, and a fluid control system 120, each being fluidly coupled via working fluid passages. Feed pump 118 is structured to pump a working fluid through working fluid circuit 122, and fluid control system 120 is structured to control fluid flow through working fluid circuit 122.

In operation, boiler 114 operates as a heat exchanger to transfer heat energy from waste heat produced by engine 102 to the working fluid in working fluid circuit 122, so as to vaporize the working fluid. The vaporized working fluid is transferred from boiler 114 to expander 116, which is positioned along working fluid circuit 122 downstream of boiler 114. As the vaporized working fluid travels through expander 116, the vapor expands, thereby driving a turbine of expander 116. The vaporized working fluid flows from expander 116 to condenser 112, where the working fluid is cooled and condensed back to a liquid, and subsequently recycled through working fluid circuit 122. According to various embodiments, expander 116 may be a turbine expander, magnetic coupling expander, piston expander, or any other type of expander.

Gearbox 108 includes a first gear train 124 and a hub 126. First gear train 124 and hub 126 may be positioned within an enclosure (not shown), which may also house various other components of WHR system 106, such as, for example, condenser 112, feed pump 118, and fluid control system 120. In addition, the enclosure may provide mounting surfaces for various components of FEAD 110. First gear train 124 operatively couples expander 116 and hub 126 so as to transfer torque from expander 116 to hub 126. First gear train 124 may include one or more gears structured to reduce a rotational velocity of hub 126 relative to that of expander 116. Hub 126 is operatively coupled to one or both of feed pump 118 of WHR system 106, and a pulley 130 of FEAD 110. Accordingly, energy recovered by WHR system 106 via expander 116 is utilized to drive one or both of feed pump 118 of WHR system 106 and pulley 130 of FEAD 110. In some embodiments, gearbox 108 may operatively couple expander 116 to engine 102 (e.g., to the crankshaft of engine 102) to transmit energy to engine 102. In one example, gearbox 108 operative couples expander 116 via a direct gear-to-gear connection. In some embodiments, gearbox 108 may operatively couple expander 116 to other components of engine system 100, or components external to engine system 100.

FEAD 110 includes an accessory 132 operatively coupled to pulley 130 via a belt 134. Although not shown in FIG. 1, FEAD 110 may include several pulleys 130 and several accessories 132. In some embodiments, one or more accessories 132 may be coupled to gearbox 108 via a direct gear-to-gear connection. Accessories 132 may include, for example, an alternator, a water pump, a compressor, etc. In one variation, belt 134 is operatively coupled to a crankshaft 136 of engine 102. Accordingly, energy recovered by WHR system 106 may be transmitted back to engine 102 via FEAD 110.

Some embodiments utilize a combination of one or more belt drives and one or more direct gear-to-gear connections to operatively couple any combination of engine 102, WHR system 106, gearbox 108 and FEAD 110. In some embodiments, arrangements that utilize a combination of belt drives and geared connections may exhibit lower noise and vibration than other arrangements.

Figure 2:
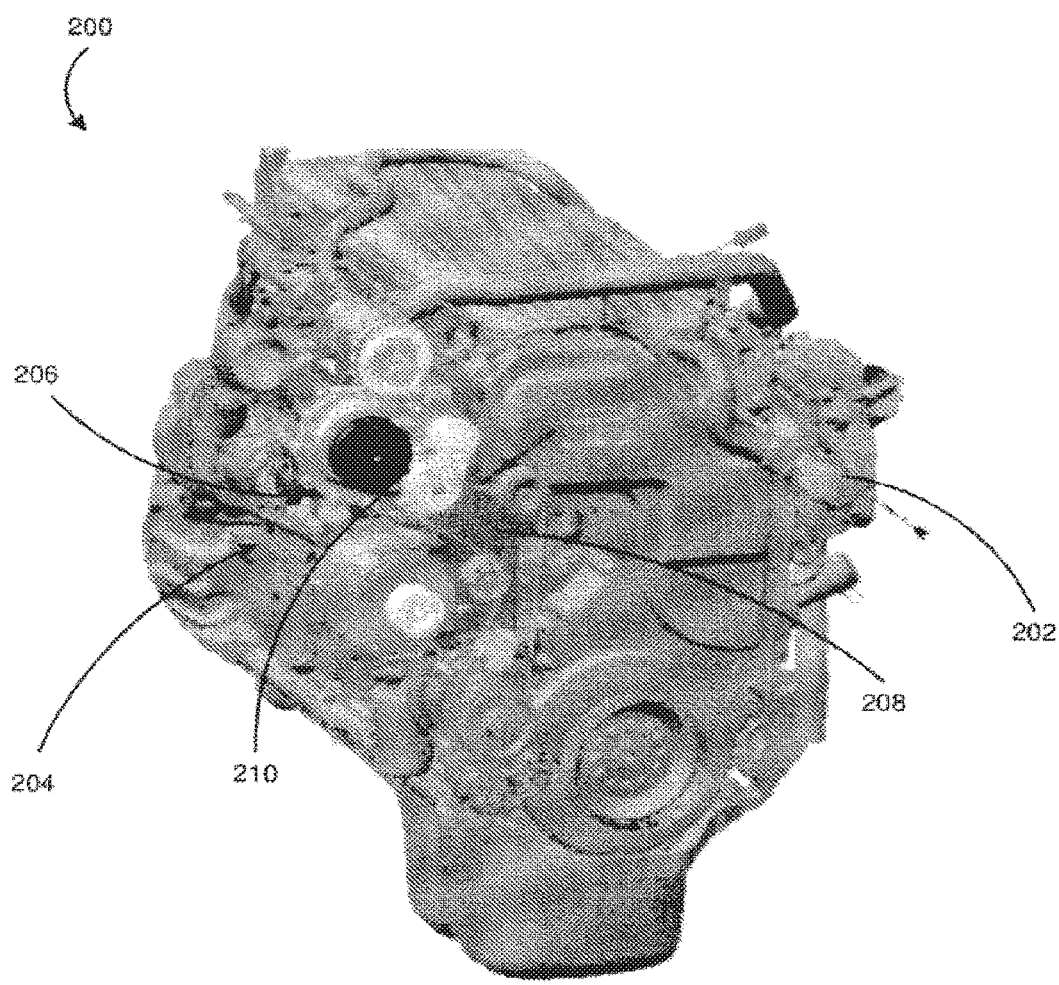
FIG. 2 is a perspective view illustration of an embodiment of an engine system, including an engine and a WHR power drive system.

FIG. 2 is a perspective view illustration of an engine system 200, including an engine 202 and a WHR power drive system 204, according to an embodiment. WHR power drive system 204 may be similar to WHR power drive system 104 of FIG. 1. As illustrated in FIG. 2, WHR power drive system 204 includes a WHR system 206, a gearbox 208, and an FEAD 210. In the embodiment illustrated in FIG. 2, WHR power drive system 204 is structured such that some or all of the components of each of WHR system 206, gearbox 208, and FEAD 210 are integrated into a single unitary assembly that is removable from the engine 202 as a single component. Gearbox 208 is best seen in FIG. 12. WHR power drive system 204 includes an enclosure 228 that is shared by both WHR system 206 (not shown) and gearbox 208. Enclosure 228 is structured to enclose and protect various components of WHR system 206 and gearbox 208.

FIGS. 3 and 4 are front elevational view illustrations of gearbox 208 of WHR power drive system 204. Enclosure 228 includes an enclosure cover 238, shown in FIG. 3, which is removable to provide access to components of WHR system 206 and gearbox 208. Enclosure 228 also defines integral mounting features 240 (e.g., brackets or standoffs) for various components, including components of FEAD 210. Accordingly, enclosure 228 eliminates the need for separate mounting brackets for FEAD 210. In FIG. 4, enclosure cover 238 is omitted. As illustrated in FIG. 4, a hub 226 and a bull gear 242 of a first gear train 224 of gearbox 208 are disposed within enclosure 228. Bull gear 242 is operatively coupled to hub 226 such that bull gear 242 does not rotate relative to hub 226. In various embodiments, bull gear 242 is press-fit or keyed to hub 226. Bull gear 242 is further operatively coupled (e.g., in meshed engagement) with a pinion 244 of an expander 216 of WHR system 206.

Accordingly, bull gear 242 is structured to transmit torque from expander 216 of WHR system 206 to hub 226.

Figure 5:
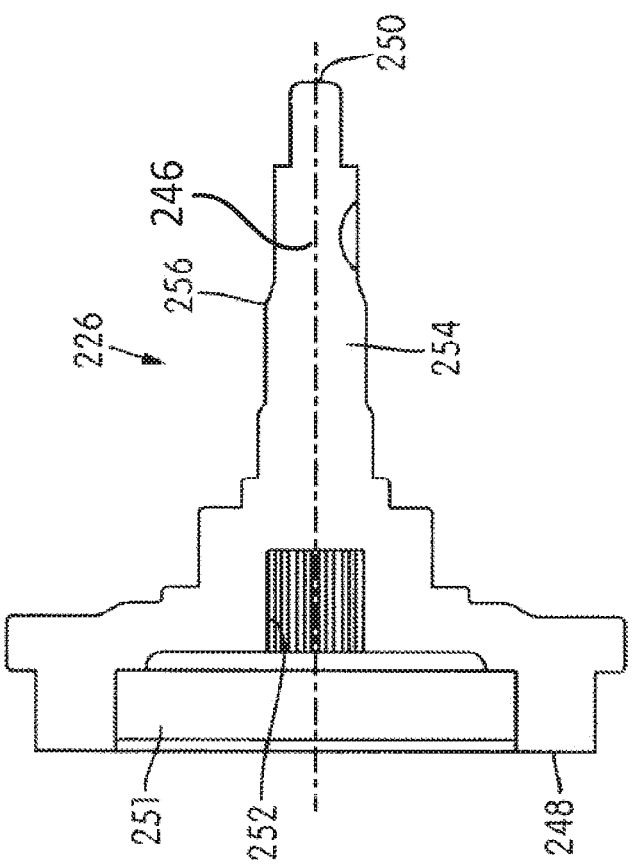
FIG. 5 is a side elevational view illustration of a hub of the gearbox of FIG. 3.

FIG. 5 is a side elevational view illustration of hub 226 of gearbox 208. Hub 226 supports bull gear 242 and is structured to transmit torque from WHR system 206 to a pulley (not shown) of FEAD 210. Hub 226 extends along a longitudinal axis 246 from a first end 248 to a second end 250. Hub 226 defines a recess 251 proximate first end 248. Recess 251 is structured to receive at least a portion of a feed pump (not shown) of gearbox 208. Hub 226 further defines a female spline 252 (e.g., of an SAE spline coupling) extending further into hub 226 from recess 251 towards second end 250. Female spline 252 is structured to receive a corresponding male spline of the feed pump. Hub 226 also includes a shaft 254 that extends along longitudinal axis 246 to second end 250. Shaft 254 defines several engagement features 256 structured to engage corresponding features of other components that are driven by hub 226. For example, hub 226 may be further structured to drive a lube pump (shown in FIG. 18) of gearbox 208, as well as a pulley (not shown) of FEAD 210.

Figure 6:
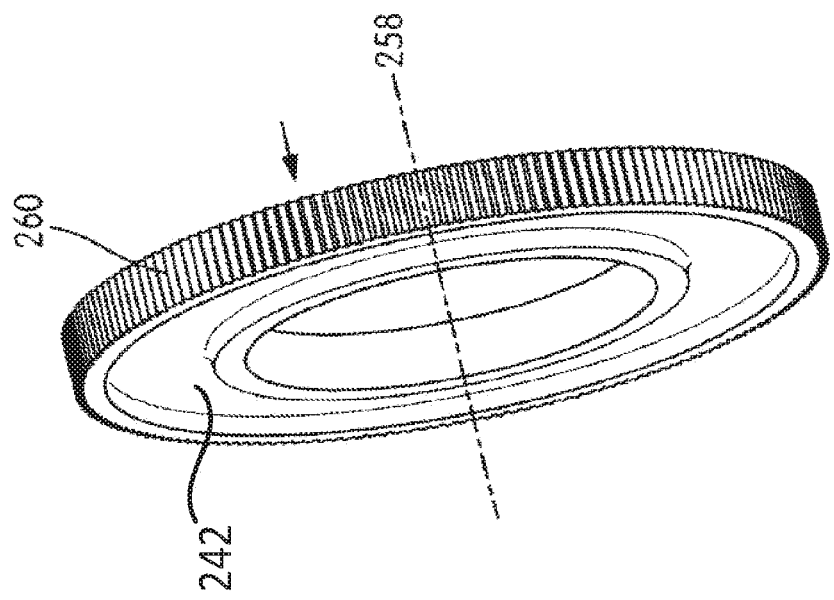
FIG. 6 is a perspective view illustration of a bull gear of the gearbox of FIG. 3.

FIG. 6 is a perspective view illustration of bull gear 242 of gearbox 208 of FIG. 3. Bull gear 242 defines a central axis 258 that, in operation, is coaxial with the longitudinal axis 246 of hub 226. Bull gear 242 defines gear teeth 260 positioned about an outer peripheral surface of bull gear 242. Gear teeth 260, along with gear teeth of pinion 244 of expander 216, define a gear ratio between bull gear 242 and pinion 244. In one embodiment, the gear ratio is greater than 10:1. In one embodiment, the gear ratio is 10.5:1.

Figure 7:
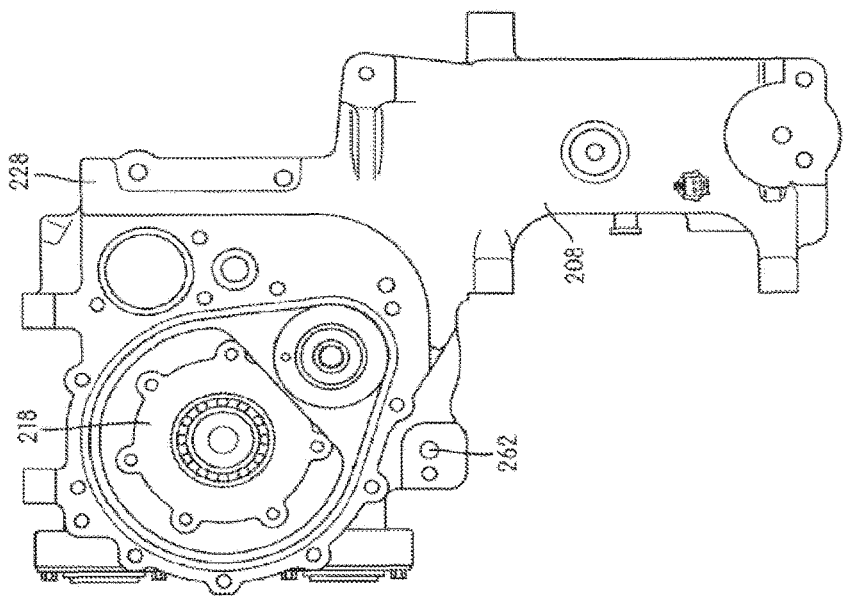
FIG. 7 is a front elevational view illustration of the gearbox of FIG. 3.

FIG. 7 is a front elevational view illustration of gearbox 208 of FIG. 3, with hub 226 and bull gear 242 removed from gearbox 208. As illustrated in FIG. 7, a feed pump 218 of WHR system 206 is also disposed within enclosure 228, adjacent (e.g., behind in the orientation shown) hub 226 (not shown). Feed pump 218 is structured to circulate a working fluid (e.g., a refrigerant) through a working fluid circuit. Enclosure 228 defines an intake port 262 of the working fluid circuit.

Figure 8:
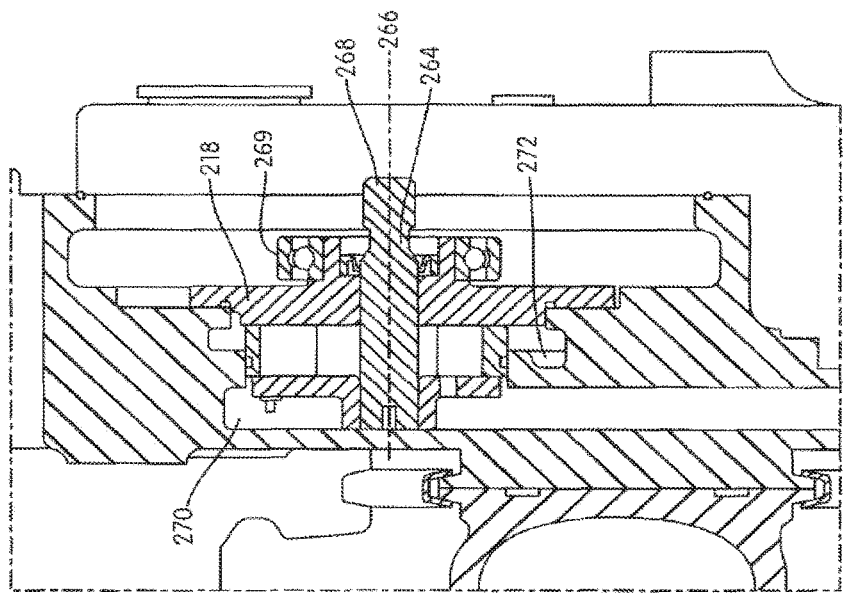
FIG. 8 is a cross-sectional side view illustration of the gearbox of FIG. 3.

FIG. 8 is a cross-sectional side view illustration of gearbox 208 of FIG. 3. Feed pump 218 includes a shaft 264 extending along a longitudinal axis 266 of feed pump 218. Longitudinal axis 266 of feed pump 218 is coaxial with longitudinal axis 246 of hub 226 (illustrated in FIG. 5) when assembled. Shaft 264 defines a male spline 268 structured to engage female spline 252 of hub 226. Enclosure 228 defines a suction cavity 270 and a discharge cavity 272, which form a portion of the working fluid circuit. Feed pump 218 is structured to draw working fluid from suction cavity 270 and to discharge the working fluid into the discharge cavity 272. A bearing 269 supports feed pump 218 and shaft 264.

Figure 9:
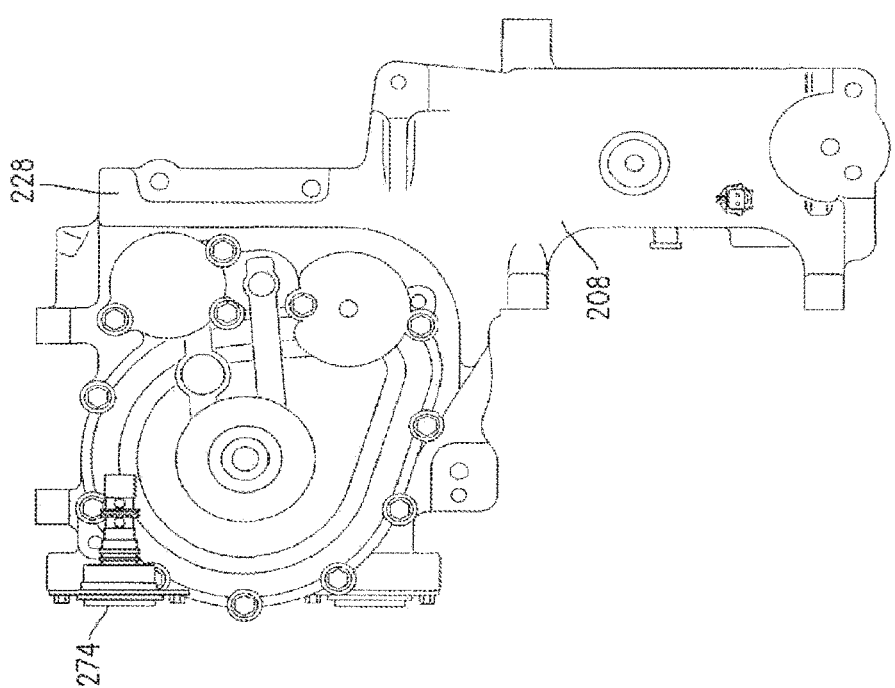
FIG. 9 is a front elevational view illustration of the gearbox of FIG. 3 showing a flow control valve of the WHR power drive system of FIG. 2.

FIG. 9 is a front elevational view illustration of gearbox 208 showing a flow control valve 274 of WHR system 206 of FIG. 2. Flow control valve 274 is part of a fluid control system of WHR system 206. Flow control valve 274 is removably coupled to enclosure 228 of gearbox 208. Flow control valve 274 controls flow of the working fluid through the working fluid circuit. In particular, flow control valve 274 controls flow of the working fluid to a boiler (not shown) of WHR system 206. In some embodiments, flow control valve 274 also controls flow of the working fluid from the working fluid circuit to other fluid circuits, such an exhaust gas recirculation ("EGR") fluid circuit.

Figure 10:
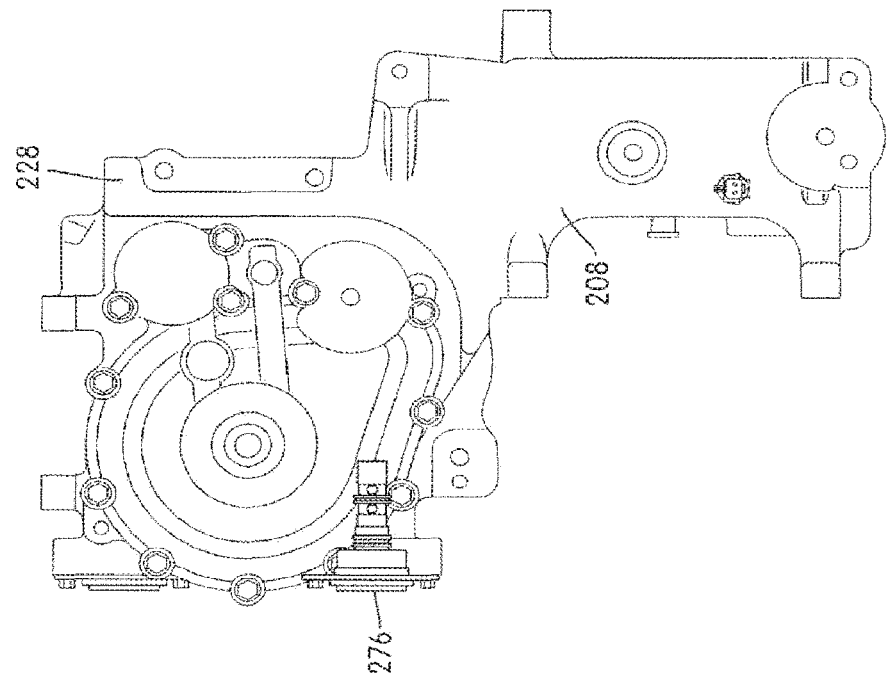
FIG. 10 is a front elevational view illustration of the gearbox of FIG. 3 showing a bypass valve of the WHR power drive system of FIG. 2.

FIG. 10 is a front elevational view illustration of gearbox 208 showing a bypass valve 276 of WHR system 206 of FIG. 2. Bypass valve 276 is also part of the fluid control system of WHR system 206. Bypass valve 276 is removably coupled to enclosure 228 of gearbox 208. Bypass valve 276 controls flow of the working fluid through the working fluid circuit by selectively bypassing flow of the working fluid to an inlet of feed pump 218 so as to bypass the boiler (not shown).

FIG. 11 is a front elevational view illustration of gearbox 208 of FIG. 3 showing expander 216 of WHR system 206 of FIG. 2. Expander 216 includes an oil drain 280 positioned on a lower surface 281 of gearbox 208 to facilitate oil drainage from the system. In particular, oil drain 280 is positioned on a surface that is riot obstructed by other components, such that an operator may access oil drain 280.

FIG. 12 is a perspective view illustration of WHR power drive system 204 of FIG. 2. FEAD 210 includes one or more accessories of the engine system 200, as well as driving components structured to transmit power to drive the accessories. For example, the driving components may include belt drives, pulleys, direct gearing, and clutches. According to an embodiment, FEAD 210 is structured to transmit power from WHR system 206 to the accessories of FEAD 210. In some embodiments, one or more accessories may be powered in other ways, such as by electrical or hydraulic power. FEAD 210 includes a first accessory 232, a second accessory 284, and a third accessory 285. Example accessories include a compressor, a water pump, and an alternator or motor-generator unit. The first and second accessories 232, 284 are powered by a belt drive system, including a belt 234. First and second accessories 232, 284 are operatively coupled to belt 234 via respective first and second pulleys 286, 287. FEAD 210 also includes a clutch 282 structured to selectively couple first and second accessories 232, 284 of FEAD 210 to WHR system 206 (not shown). More specifically, clutch 282 is selectively coupled to first gear train 224 of gearbox 208, which operatively couples expander 216 of WHR system 206 with FEAD 210. The clutch 282 includes a clutch pulley 283 structured to operatively couple clutch 282 to first and second pulleys 286, 287 of, respectively, first and second accessories 232, 284, via the belt 234.

In one embodiment, third accessory 285 is operatively coupled to WHR system 206 via a second gear train (not shown) of gearbox 208. For example, third accessory 285 may include an input shaft with a pinion that engages the second gear train so as to transfer torque from WHR system 206 to third accessory 285. In other embodiments, third accessory 285 is operatively coupled to the belt 234.

In some embodiments, second pulley 287 is a dual pulley. A second belt (not shown) operatively couples FEAD 210 with the crankshaft of engine 202 (not shown). Accordingly, energy may be transferred from the crankshaft of the engine to FEAD 210 via the second belt. In one embodiment, third accessory 285 is a motor-generator unit, which may operate to power the components of FEAD 210 when engine 202 is not running. The belts and pulleys may comprise a belt drive.

Figure 13:
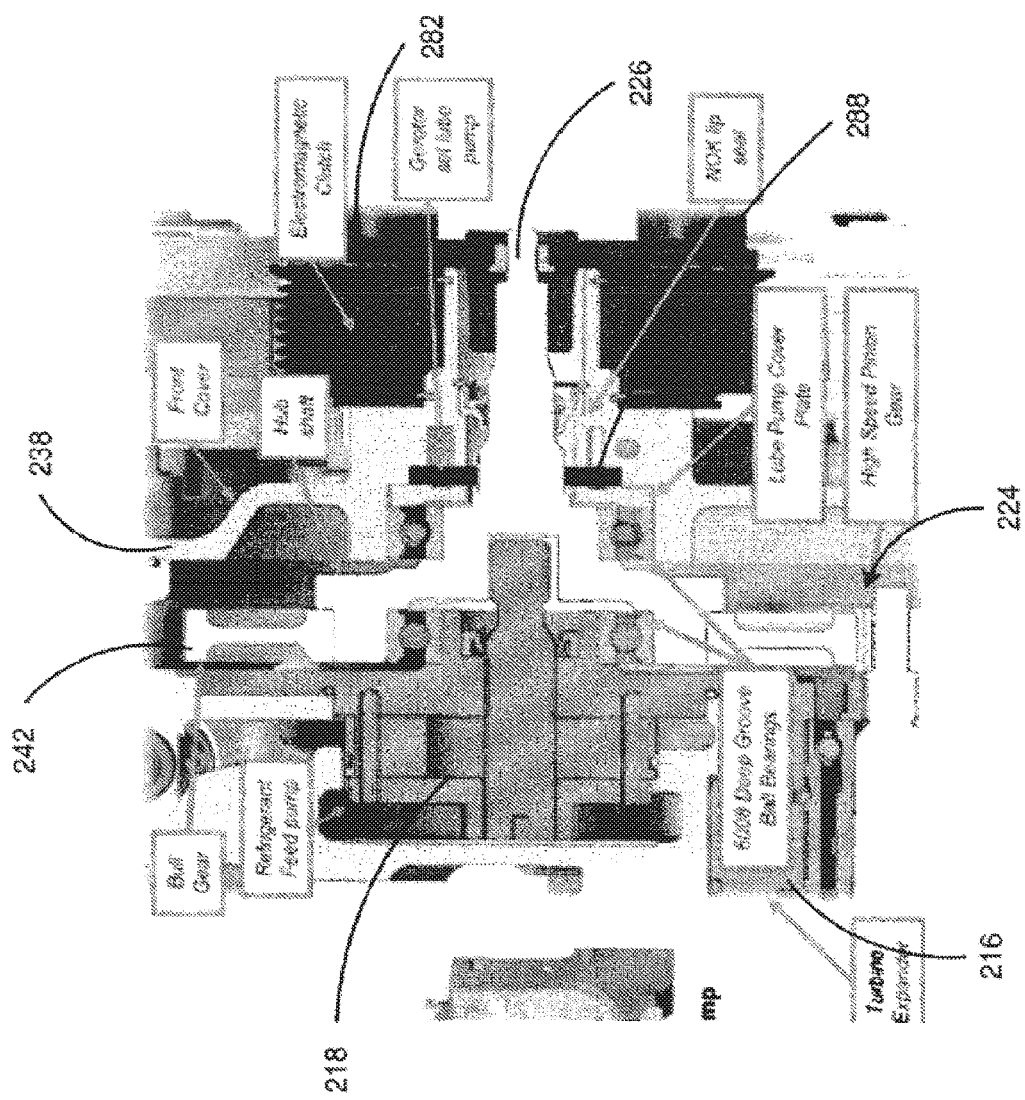
FIG. 13 is a partial cross-sectional view illustration of the WHR power drive system of FIG. 2.

FIG. 13 is a partial cross-sectional view illustration of WHR power drive system 204. The cross-section extends through several components of WHR power drive system 204, including feed pump 218 and expander 216 of WHR system 206; first gear train 224, hub 226, enclosure cover 238, and bull gear 242 of gearbox 208; and the clutch 282 of FEAD 210. FIG. 13 further illustrates a lube pump 288 of gearbox 208. Lube pump 288 is operatively coupled to hub 226 of gearbox 208. Lube pump 288 is structured to pump a lubricant (e.g., oil) through gearbox 208. In one embodiment, lube pump 288 is a gerotor. In some embodiments, lube pump 288 is structured to pump a lubricant through a bearing of expander 216. Accordingly, hub 226 provides integrated operation of each of feed pump 218, first gear train 224, and lube pump 288.

Having described a WHR power drive system, attention is now turned to the lubrication system for the WHR power drive. Referring to FIG. 14, a schematic representation of a gearbox 300 is provided. Gearbox 300 mechanically couples a crankshaft 312 of a combustion engine to an expander shaft 310 of an expander of the WHR system to thereby transfer torque generated by the expander to crankshaft 312. In the present embodiment, gearbox 300 includes first and second gear trains 314, 316. First gear train 314 comprises pinion 244 mounted on expander shaft 310 and bull gear 242 mounted on an output shaft 352. In one variation, output shaft 352 is coupled to, and rotates with, hub 126, therefore expander shaft 310 drives output shaft 352 and thereby also drives feed pump 118 forming an integrated system. Bull gear 242 has teeth 260 engaging teeth 346 of pinion 244 to drive bull gear 242 via expander shaft 310. Second gear train 316 comprises a drive pulley 320 mounted on output shaft 352 and a load pulley 322 connected to crankshaft 312 and coupled to drive pulley 320 by a belt 324. Also mounted on output shaft 352 is a portion of lube pump 288. Thus, expander shaft 310 drives lube pump 288 and simultaneously provides torque produced by recovered waste heat to crankshaft 312. In other embodiments, first and second gear trains 314, 316 may comprise pulleys or different types of gears known in the art.

FIG. 15 is a schematic representation of a fluid circuit 354 thermally coupled with a lubrication circuit 360. The physical locations of the components of these circuits are further described with reference to FIGS. 16-22. Fluid circuit 354 is provided to circulate a working fluid to cool lubrication fluid. Fluid circuit 354 comprises a working fluid inlet rifle 355, cooling well 356 (best shown in FIG. 20), a working fluid outlet rifle 357, and a working fluid feed pump 358. Additional cooling rifles (not shown) are also provided. An expander (not shown) and a condenser (not shown) complete fluid circuit 354. Working fluid feed pump 358 pumps the working fluid through fluid circuit 354. Lube pump 288 is adjacent cooling well 356. Lubrication circuit 360, lube pump 288, a pressure dump valve 364, a lube filter 368, expander shaft bearing 342, a lube return slot 376 (best shown in FIG. 22, a lube sump 380, and a differential pressure sensor 398 (best shown in FIG. 16).

Figure 16:
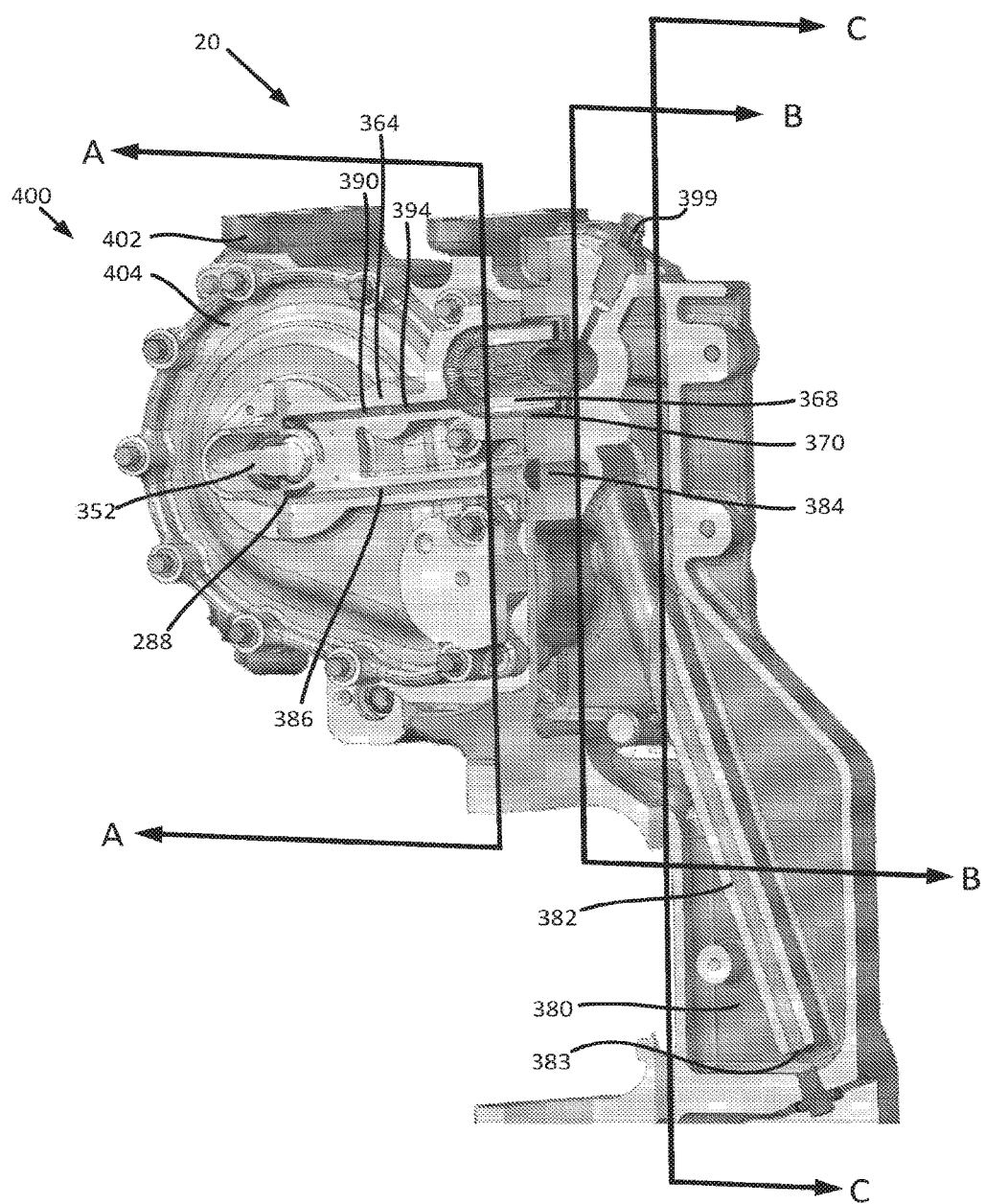
FIG. 16 is a partially sectioned perspective view illustration of a gearbox according with the invention and set forth in the disclosure, sectioned in part along planes A-A, B-B, and C-C.

FIGS. 16-22 provide partially and fully sectioned perspective views of gearbox 300. Referring now to FIG. 16, lube pump 288 generates suction to draw the lubrication fluid from lube sump 380 via a lube sump rifle 382 having an inlet port 383, a cross-over rifle 384, and a lube pump suction rifle 386. A lube pump discharge rifle 390 fluidly couples lube pump 288 to pressure dump valve 364. A lube filter rifle 394 couples pressure dump valve 364 with lube filter 368. An expander rifle 398 fluidly couples expander shaft bearing 342 with lube filter 368. Lube return slot 376 fluidly couples expander shaft bearing 342 with lube sump 380, completing lubrication circuit 360. In some embodiments, the lubrication fluid is miscible with the working fluid. In some embodiments, cooling fluid circuit 354 and lubrication circuit 360 are not fluidly isolated, thus some amount of mixing of the fluids may occur. In the present embodiment, lubrication circuit 360 is independent from a lubrication system of the internal combustion engine. By independent it is meant that the fluid systems are driven by separate pumps and the fluids do not mix. Lube filter 368 is positioned in a lube filter cavity 370. A pressure rifle 398 couples filter cavity 370 with pressure sensor 399.

Figure 20:
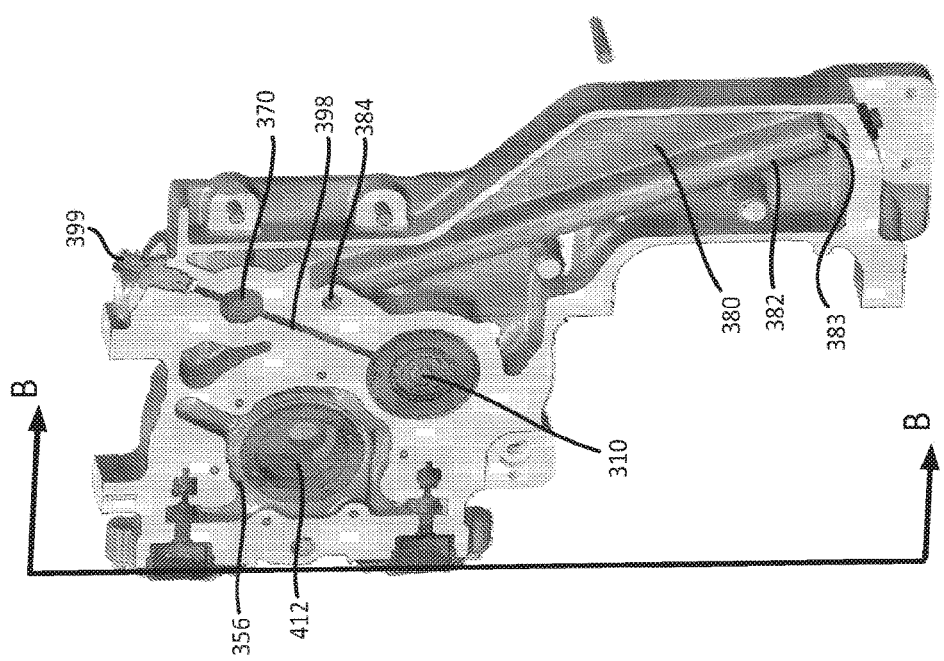
FIG. 20 is a perspective view illustration of the gearbox of FIG. 16 sectioned along plane B-B.

Working fluid feed pump 358 is located in a feed pump cavity 412 (best shown in FIG. 20). Gearbox 300 is partially enclosed by an enclosure 400. As shown, at least lubrication circuit 360 and first gear train 314 are located within enclosure 400. Pulleys of second gear train 316 are positioned outside enclosure 400 to facilitate installation of the unit by removing belt 324. The working fluid flowing through fluid circuit 354 extracts heat from enclosure 400, lube pump 288, and the lubrication fluid, to maintain a desired temperature in gearbox 300. In a variation of the present embodiment, working fluid feed pump 358 is not mounted on gearbox 300.

Figure 17:
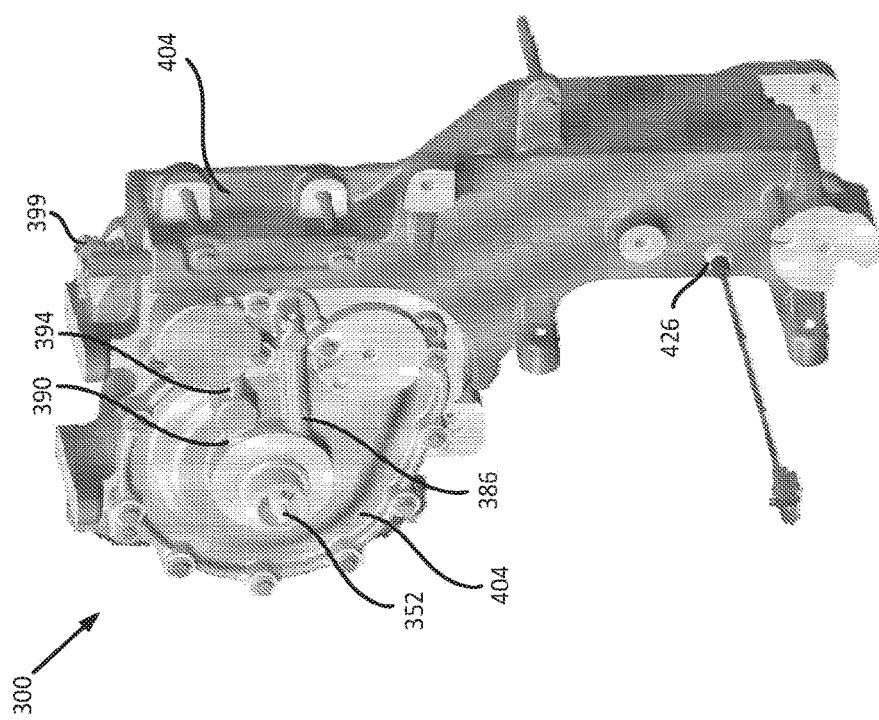
FIG. 17 is a perspective view illustration of the gearbox of FIG. 16.
Figure 21:
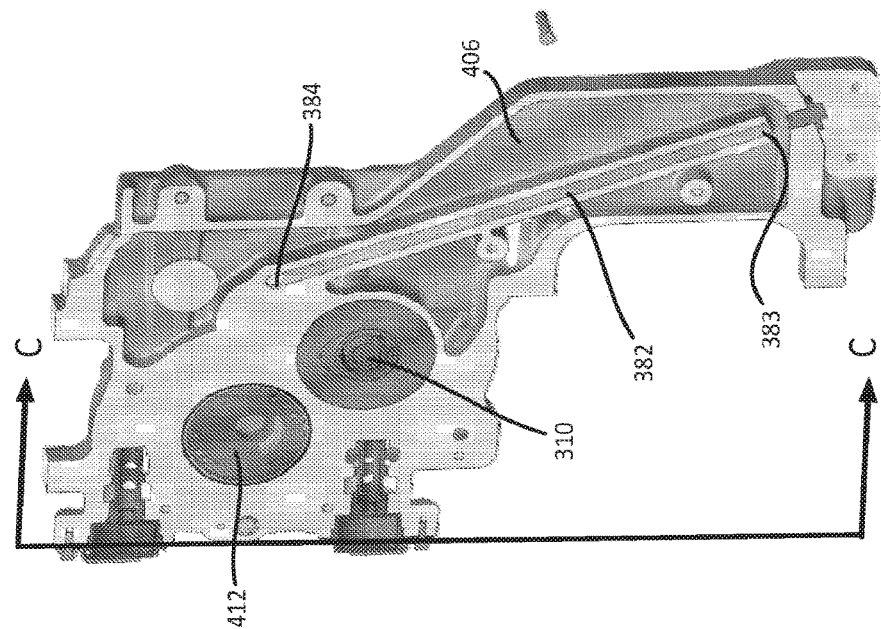
FIG. 21 is a perspective view illustration of the gearbox of FIG. 16 sectioned along plane C-C.

Referring to FIGS. 16 and 17, enclosure 400 comprises an enclosure body 402 and an enclosure cover 404. Components of lubrication circuit 360 are formed in enclosure body 402 and enclosure cover 404. Enclosure 400 also encloses components of fluid circuit 354. Gearbox 300, and enclosure 400, may be supported by the internal combustion engine and may be positioned at the front of the internal combustion engine, to more easily couple gearbox 300 to crankshaft 312, as described previously. FIG. 16 shows enclosure 400 partially sectioned along planes A-A, B-B, and C-C to illustrate integration of gearbox 300 and lubrication circuit 360 in a compact enclosure. FIG. 17 provides a non-sectioned perspective view of gearbox 300. FIG. 18 provides a perspective view of gearbox 300 sectioned along plane A-A. Plane A-A traverses enclosure cover 404. FIG. 19 provides a perspective view of gearbox 300 with enclosure cover 404 removed. FIG. 20 provides a perspective view of gearbox 300 sectioned along plane B-B. FIG. 21 provides a perspective view of gearbox 300 sectioned along plane C-C.

Operation of gearbox 300 and lubrication subassembly 360 will now be described in additional detail. When the combustion engine operates it generates heat that is recovered by the WHR system to cause expander shaft 310 to rotate, which rotates output shaft 352, and lube pump 288, at a speed (radial) proportional to the teeth ratio of pinion gear 244 and bull gear 242. At the same time drive pulley 320 rotates load pulley 322 to transfer torque (power) to crankshaft 312. The expander may rotate at a very high speed relative to the speed of crankshaft 312. First and second drive trains 314, 316 have a speed reducing effect so that the speed of load pulley 322 substantially matches the speed crankshaft 312. Lube pump 288 draws the lubrication fluid from lube sump 380 and discharges the lubrication fluid through pressure dump valve 364 and lube filter 368 to expander shaft bearing 342 to lubricate expander shaft bearing 342. Pressure dump valve 364 regulates the pressure generated by lube pump 288, or first pressure, to a second, lower, pressure. In one example, the first pressure is reduced to 20 PSI. Differential pressure sensor 399 is configured to transmit a pressure signal including a pressure value of a differential pressure between the second pressure and a pressure at lube sump 380. A pressure value exceeding a pressure threshold indicates a fault in the lubrication circuit. The lubrication fluid passes through lube return slot 376 and returns to lube sump 380 by operation of gravity.

FIG. 17 illustrates enclosure 400 with enclosure cover 404 in place. Also shown is a temperature sensor 426 configured to send a temperature signal including temperature values representative of the temperature of the lubrication fluid or enclosure 400. A fault or warning signal may be generated by an electronic control unit (not shown) if the temperature value exceeds a temperature threshold, indicating loss of cooling. FIG. 18 illustrates is a view of gearbox 300 sectioned along plane A-A, which traverses enclosure cover 404, to illustrate the portion of lubrication circuit 360 located on enclosure cover 404. There, it can be seen that lube pump 288 is positioned between enclosure cover 404 and enclosure body 402.

Turning now to FIG. 19, gearbox 300 is shown with enclosure cover 404 removed. There, it is shown a hub comprising portions 430 and 432, similar to hub 126, from which output shaft 352 (not shown) extends. Bull gear 242 has an internal circular opening in contact with the circumference of portion 430 and is affixed thereto as previously described. Lube filter 368 is positioned in a lube filter cavity 370 that traverses the joint between enclosure cover 404 and drive enclosure body 402. The location of feed pump cavity 412 is also shown. An output shaft bearing 414 supports the hub as it rotates.

FIG. 20 provides a perspective view of gearbox 300 sectioned along plane B-B and illustrates the position of feed pump cavity 412. An expander supply rifle 398 is coupled to lube filter cavity 370 to provide lubrication fluid at the low pressure to expander bearing 342. Cooling well 356 and cross-over rifle 384 is also shown. FIG. 21 provides a perspective view of gearbox 300 sectioned along plane C-C and shows cross-over rifle 384 which is fluidly coupled by lube sump rifle 382 to draw lubrication fluid (oil) from inlet port 383 and lube sump 380. Lubrication fluid 400 is also shown.

Figure 22:
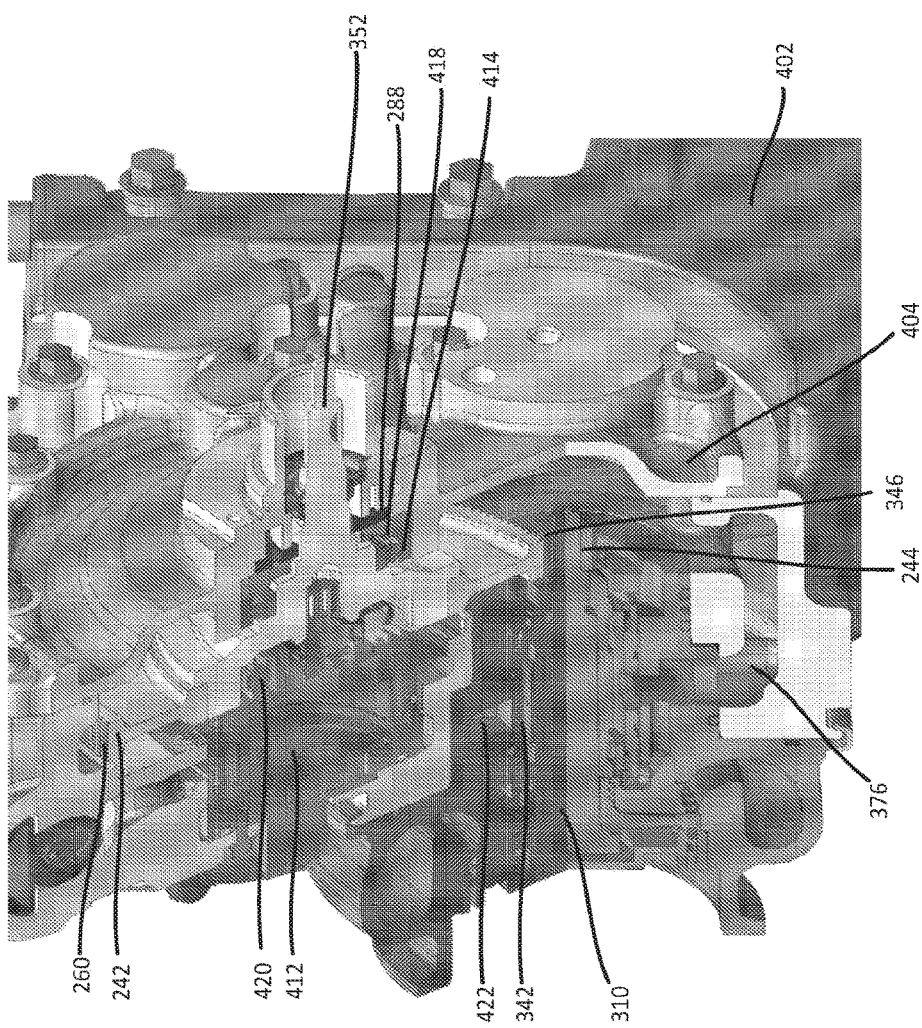
FIG. 22 is a partially sectioned perspective view illustration of the gearbox of FIG. 16.

FIG. 22 is a partially sectioned perspective view of gearbox 300 showing a lube supply slot 422 above expander shaft bearing 342, and lube return slot 376 below. Lube supply slot 422 is fluidly coupled to expander supply rifle 398 and causes the lubrication fluid to fall on expander shaft bearing 342 as it rotates. The lubrication fluid then falls into lube return slot 376 below and therethrough returns to lube sump 380. A cover plate 418 encloses lube pump 288 on the opposite side of enclosure cover 404. A couple of bearings 414, 420 are disposed on opposing sides of the hub supporting output shaft 352.

Figure 24:
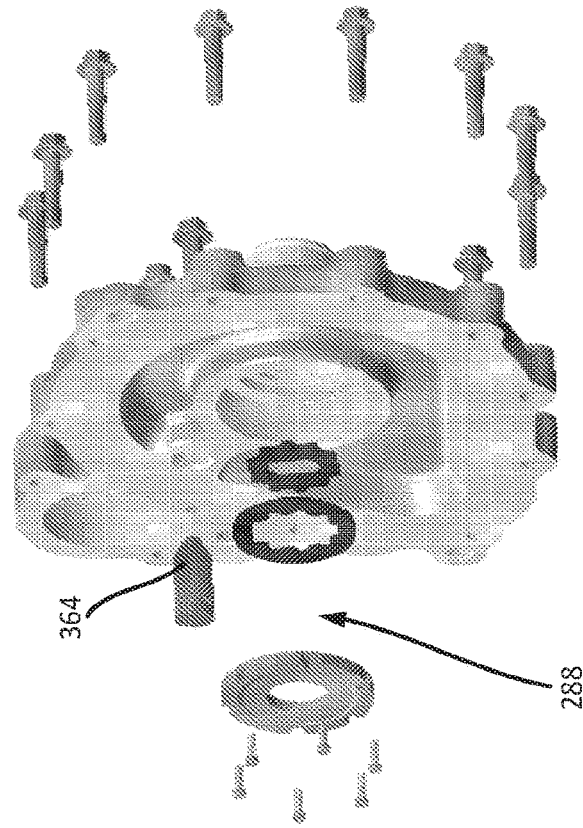
FIGS. 23 and 24 are plan and exploded perspective view illustrations of components of a lubrication circuit.
Figure 23:
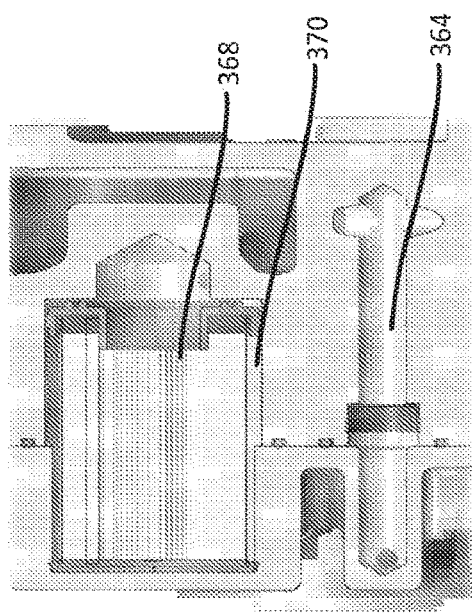

FIGS. 23 and 24 provide detailed views of portions of lubrication circuit 360 including lube filter 368, pressure dump valve 364, and lube pump 288.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

I claim:

1. A combustion engine comprising:
   a crankshaft;
   a waste heat recovery system including an expander having an expander shaft;
   a lube pump;
   an output shaft coupled to the lube pump;
   a first speed-reducing means for transferring power from the expander shaft to the output shaft to drive the lube pump;
   a second speed-reducing means for transferring power from the output shaft to the crankshaft; and
   an expander bearing supporting the expander shaft, a lube sump in a power drive housing, and a lube discharge rifle in the power drive housing, wherein the lube pump is configured to suction lubrication fluid from the lube sump and discharge the lubrication fluid through the lube discharge rifle to lubricate the expander bearing and return the lubrication fluid to the lube sump.

2. The combustion engine of claim 1, further comprising a power drive housing including an enclosure cover mounted on a power drive housing body, wherein the first speed-reducing means is enclosed within the power drive housing.

3. The combustion engine of claim 1, further comprising a cooling pump coupled to the output shaft, wherein the output shaft is configured to simultaneously drive the lube pump and the cooling pump.

4. A combustion engine comprising:
   a crankshaft;
   a waste heat recovery system including an expander having an expander shaft;
   a lube pump;
   an output shaft coupled to the lube pump;
   a first speed-reducing means for transferring power from the expander shaft to the output shaft to drive the lube pump;
   a second speed-reducing means for transferring power from the output shaft to the crankshaft;
   a power drive housing including an enclosure cover mounted on a power drive housing body; and
   a lube sump enclosed by the power drive housing, wherein the lube pump is configured to suction a lubrication fluid from the lube sump to lubricate the first speed-reducing means.

5. The combustion engine of claim 4, further comprising an expander bearing supporting the expander shaft, a lube sump in a power drive housing, and a lube discharge rifle in the power drive housing, wherein the lube pump is configured to suction lubrication fluid from the lube sump and discharge the lubrication fluid through the lube discharge rifle to lubricate the expander bearing and return the lubrication fluid to the lube sump.

6. The combustion engine of claim 4, further comprising an expander bearing supporting the expander shaft, and a lube discharge rifle and a lube return slot in the power drive housing, wherein the lube pump is configured to discharge the lubrication fluid through the lube discharge rifle to lubricate the expander bearing.

7. The combustion engine of claim 6, wherein the lube discharge rifle is positioned in the enclosure cover of the power drive housing.

8. The combustion engine of claim 4, wherein the lubricating fluid flows through a lubrication circuit that is independent of a lubrication circuit of an internal combustion system driving the waste heat recovery system.

9. A combustion engine comprising:
   a crankshaft;
   a waste heat recovery system including an expander having an expander shaft;
   a lube pump;
   an output shaft coupled to the lube pump;
   a first speed-reducing means for transferring power from the expander shaft to the output shaft to drive the lube pump;
   a second speed-reducing means for transferring power from the output shaft to the crankshaft;
   a cooling pump coupled to the output shaft;
   a lube sump;
   an expander bearing supporting the expander shaft; and
   a cooling circuit in the power drive housing,
   wherein the lube pump is operable to suction lubrication fluid from the lube sump and discharge the lubrication fluid to lubricate the expander bearing, and wherein the cooling pump is operable to pump a working fluid through the cooling circuit to transfer heat from a lubrication fluid to the working fluid.

10. The combustion engine of claim 9, wherein the lubrication fluid is miscible with the working fluid.

11. The combustion engine of claim 9, wherein the cooling pump is operable to circulate the working fluid through the power drive housing to cool the power drive housing.

12. A combustion engine comprising:
a crankshaft;
a waste heat recovery system including an expander having an expander shaft;
a lube pump;
an output shaft coupled to the lube pump;
a first gear train operable to transfer power from the expander shaft to the output shaft to drive the lube pump; and
a second gear train operable to transfer power from the output shaft to the crankshaft;
a power drive housing including an enclosure cover mounted on a power drive housing body, wherein the first gear train is enclosed within the power drive housing; and
an expander bearing supporting the expander shaft, a lube sump in the power drive housing, and a lube discharge rifle in the power drive housing, wherein the lube pump is operable to suction lubrication fluid from the lube sump and discharge the lubrication fluid through the lube discharge rifle to lubricate the expander bearing.

13. The combustion engine of claim 12, further comprising a cooling pump coupled to the output shaft, wherein the output shaft is configured to simultaneously drive the lube pump and the cooling pump.

14. The combustion engine of claim 12, wherein the lube discharge rifle is positioned in the enclosure cover of the power drive housing.

15. The combustion engine of claim 12, wherein the lubricating fluid flows through a lubrication circuit that is independent of another lubrication circuit of the combustion engine which is operable to drive the waste heat recovery system.

16. The combustion engine of claim 12, further comprising a cooling circuit in the power drive housing, wherein the cooling pump is operable to pump a working fluid through the cooling circuit to transfer heat from a lubrication fluid to the working fluid.

17. The combustion engine of claim 16, wherein the lubrication fluid is miscible with the working fluid.

18. The combustion engine of claim 16, wherein the cooling pump is operable to circulate the working fluid through the power drive housing to cool the power drive housing.

* * * * *